INVENTORS.
R.N. LONGUEMARE, JR.
H. L. TRIBBLE
BY
ATT'YS.

Nov. 29, 1966 R. N. LONGUEMARE, JR., ETAL 3,289,096
CRYSTAL OSCILLATOR FREQUENCY STABILIZATION SYSTEM
Filed Sept. 21, 1964 3 Sheets-Sheet 2

INVENTORS.
R.N. LONGUEMARE, JR.
H. L. TRIBBLE
BY
*H. H. Losch*
ATT'YS.

Nov. 29, 1966 R. N. LONGUEMARE, JR., ETAL 3,289,096
CRYSTAL OSCILLATOR FREQUENCY STABILIZATION SYSTEM
Filed Sept. 21, 1964

PHASE DETECTOR CHARACTERISTIC

INVENTORS.
R.N. LONGUEMARE, JR.
H. L. TRIBBLE
BY
ATT'YS.

United States Patent Office 3,289,096
Patented Nov. 29, 1966

3,289,096
CRYSTAL OSCILLATOR FREQUENCY
STABILIZATION SYSTEM
Robert Noel Longuemare, Jr., Ellicott City, and Halsey
L. Tribble, Glen Burnie, Md., assignors, by mesne assignments, to the United States of America as represented by the Secretary of the Navy
Filed Sept. 21, 1964, Ser. No. 398,136
2 Claims. (Cl. 331—1)

The present invention is generally related to frequency stabilization and more particularly to a system for stabilizing the instantaneous frequency of a high quality, crystal controlled oscillator circuit.

It is commonly recognized by radar systems design engineers that high performance Doppler radar systems require one or more highly phase-stable frequency references. For these systems short term or "instantaneous" stability is most critical, as opposed to the more common requirement for long term stability.

Consideration of devices of the prior art indicates that the best type of frequency reference presently known for application in such radar systems is a high quality crystal controlled oscillator. The present invention was created to further improve and stabilize the performance of high quality crystal controlled oscillators to provide an ultra phase-stable frequency reference. The invention also provides for frequency or phase modulation of the output signal in applications where such modulation would be desirable.

To attain this high degree of phase stability, the present invention utilizes a conventional crystal controlled oscillator circuit having a vernier frequency control element to provide the input signal to the succeeding elements of the stabilization system. A portion of this input signal is applied, through a resistive attenuator pad for purposes of isolation and a buffer amplifier, to a phase shift circuit utilizing a high "Q" quartz crystal series resonator in which the series resonant frequency of the crystal is selected to be identical to the frequency to be produced by the oscillator to be stabilized. The output signal provided by this series resonator phase shift circuit remains in phase with its input signal, from the oscillator to be stabilized, so long as that input signal is at the selected resonant frequency, but if the oscillator has allowed this frequency to drift slightly, the phase of this output signal will be shifted due to the frequency-phase characteristic of this phase shift circuit. This output signal from the series resonator phase shift circuit is then passed through an amplifier-limiter circuit, which is also tuned to the desired oscillator reference frequency, for amplification and removal of any undesired amplitude modulation components. The signal is then provided as a first input to a phase detector circuit. A phase reference signal is provided as a second input to the detector circuit by passing a portion of the output signal from the oscillator through a variable phase shifter which has been adjusted to provide a fixed phase shift of ninety degrees to any signal passed therethrough. This phase-shifted reference signal is then passed through a tuned amplifier-limiter circuit identical to that previously mentioned, and coupled to the phase detector circuit. This phase detector circuit produces zero output voltage when the two input signals thereto are exactly ninety degrees apart in time phase. For any other phase difference therebetween, it produces a direct current (D.C.) voltage proportional to the angular deviation from this ninety degree reference point. This D.C. voltage is passed through a D.C. amplifier controlled in such manner as to maintain a stable control loop and is then applied to the terminal coupled to the vernier frequency control element of the crystal controlled oscillator causing the oscillator frequency to be varied in a direction to reduce the phase detector output voltage to zero, which will occur when the oscillator frequency is returned to its precise design frequency. A summation point is provided between the phase detector circuit and the D.C. amplifier for injection of a modulation command signal if phase or frequency modulation of the output signal is desired in a particular application.

An object of the present invention is the provision of a frequency reference system.

Another object is to provide a system for stabilizing the instantaneous frequency of an oscillator circuit.

A further object of the invention is the provision of an ultra phase stable frequency reference system.

Still another object is to provide a phase stabilized, high quality, crystal controlled oscillator frequency reference system.

Yet another object of the present invention is the provision of a phase stabilized, high quality, crystal controlled oscillator frequency reference system having provision for modulation of its output signal.

Other objects and features of the invention will become apparent to those skilled in the art as the disclosure is revealed in the following detailed description of a preferred embodiment of the invention as illustrated in the accompanying sheets of drawing in which:

FIGURE 1 is a block diagram of the invention showing the relative association of the various component circuits within the overall system;

FIGURE 2 discloses one embodiment of a crystal controlled oscillator suitable for use in block 111 of FIGURE 1;

FIGURE 3 shows an embodiment of a buffer amplifier of a type suitable for utilization in block 113 of FIGURE 1;

FIGURE 4 discloses a schematic embodiment of a crystal phase shift circuit suitable for use in block 114 of FIGURE 1;

FIGURE 5 depicts schematically an embodiment of a tuned amplifier and limiter circuit suitable for use in blocks 115 and 118 of FIGURE 1;

FIGURE 6 presents in schematic form a suitable embodiment of a phase detector circuit for use in block 116 of FIGURE 1;

FIGURE 7 discloses a suitable embodiment of a variable phase shift circuit for utilization in block 117 of FIGURE 1;

Figure 4:
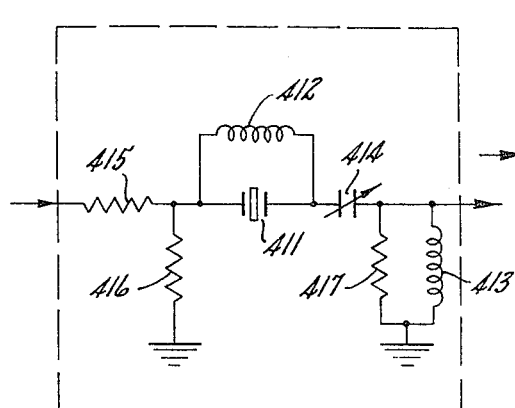
Figure 6:
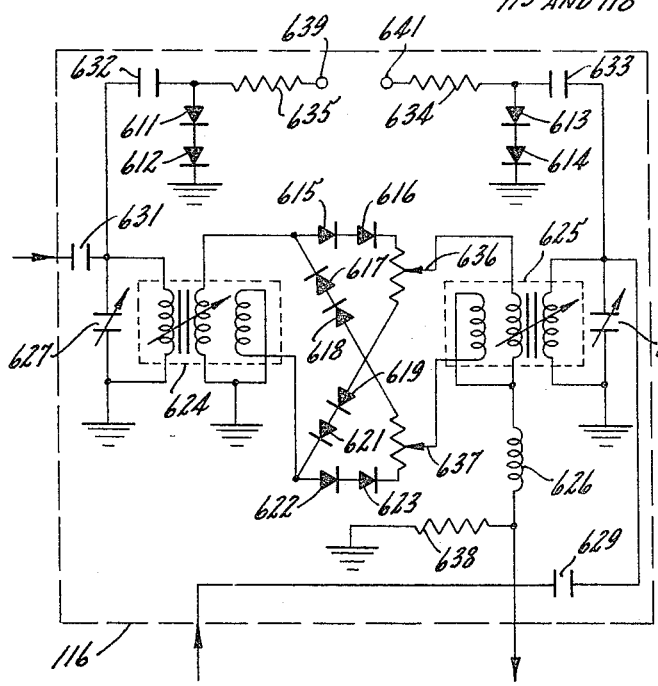
Figure 10:
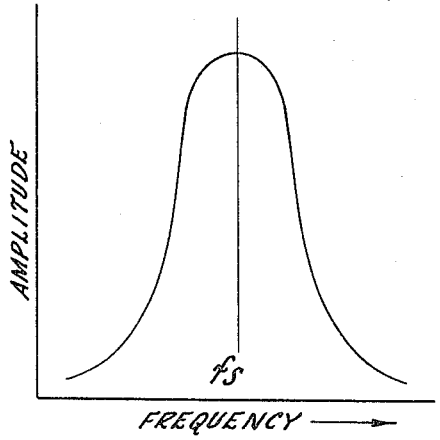
Figure 11:
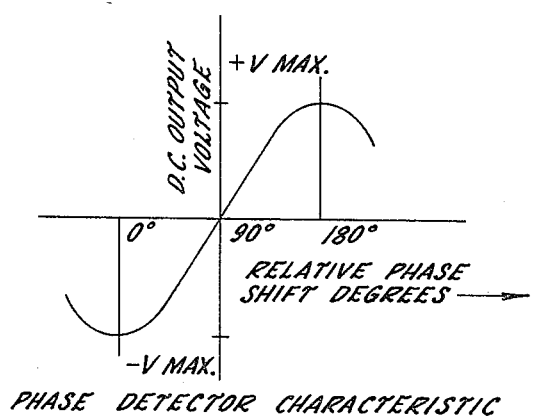

FIGURE 10 represents the relationship of the amplitude of an output signal from a series crystal circuit, such as that shown in FIGURE 4, to the frequency of the applied input signal, wherein $f_s$ represents the resonant frequency of the series crystal; and FIGURE 11 depicts the characteristic curve of a phase detector circuit such as that shown in FIGURE 6, representing the D.C. output voltage of such a circuit as a function of the difference in relative phase shift in degrees between a reference signal and an input signal to be compared therewith.

Figure 1:
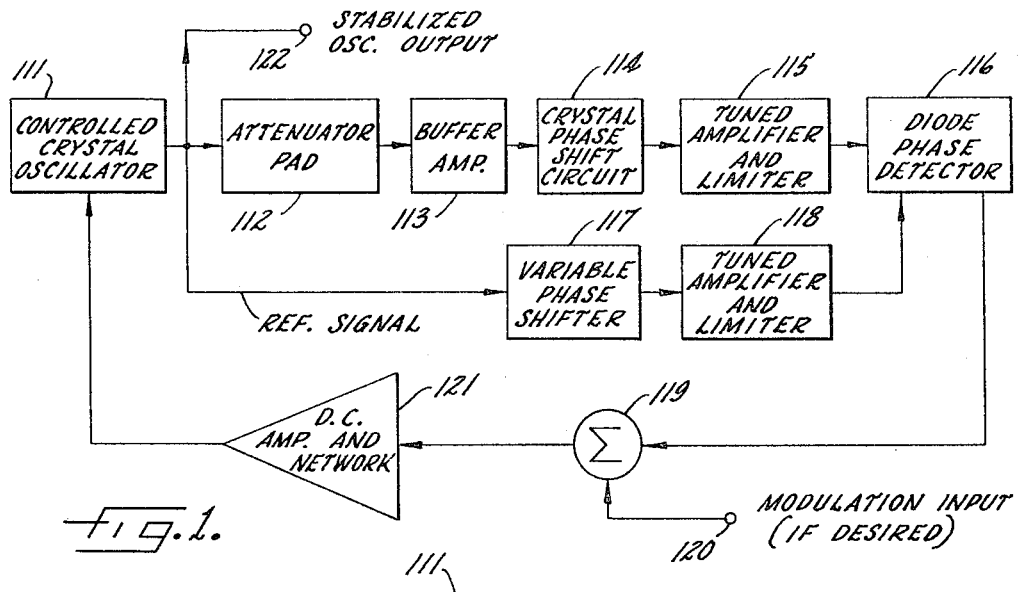

Referring now to the drawings, wherein like reference characters designate like or corresponding parts throughout the several figures, there is shown in the embodiment of FIGURE 1, a controlled crystal oscillator 111 which has its output terminal coupled to a resistive attenuator pad 112, of a type common in the art, for isolation purposes. Attenuator 112 is coupled through a buffer amplifier 113, many of which are common in the art, which increases the power level of the signal provided to a following crystal phase shift circuit 114. This crystal phase shift circuit, a suitable embodiment thereof being shown in FIGURE 4, provides an output signal which is in phase with the input signal applied thereto so long as the frequency of that input signal is equal to the series resonant frequency ($f_s$) of the crystal therein; however, deviation from this resonant frequency by the input signal causes the output signal to be shifted in phase in proportion to such frequency deviation. This output signal is applied via a tuned amplifier and limiter circuit 115 which amplifies the signal and removes any undesired amplitude modulation components thereon. Amplifier 115 is coupled to a first input terminal of a phase detector circuit 116, which has a second input terminal to which a phase reference signal is applied. That reference signal is created by coupling the output terminal of crystal oscillator 111 to a variable phase shifting circuit 117, many of which are common in the art, which has been adjusted to provide a signal at its output terminal that is shifted ninety degrees in phase from that applied to its input terminal. The output from phase shift circuit 117 is coupled through a tuned amplifier and limiter circuit 118 of the same type as circuit 115, many of which are common in the art and a suitable embodiment thereof being shown in FIGURE 5, to the second input terminal of phase detector 116 to provide the reference signal thereto. Phase detector 116, a suitable embodiment of which is shown in FIGURE 6, maintains a zero volts output signal so long as the input signal applied to its first terminal differs in phase by ninety degrees from the reference signal applied to its second terminal; however, if the phase difference between these two applied signals deviates from ninety degrees, phase detector 116 will provide a D.C. output voltage proportional to this deviation. The output terminal of phase detector 116 is coupled through a summation or connection point 119 to a D.C. amplifier network 121, an embodiment of which is shown in detail in FIGURE 8, whose frequency response is controlled in order to maintain a stable control loop. An input terminal 120 is coupled to summation point 119 to provide a path for a modulation input signal if it is desired to modulate the signal generated by oscillator 111. The output terminal of amplifier 121 is coupled to the input voltage control terminal of oscillator 111. The stabilized oscillator output signal provided by the invention is available at output terminal 122, which is coupled to the output terminal junction of oscillator 111.

FIGURES 2 through 8 disclose detailed embodiments of circuitry suitable for use in various blocks of the invention as shown in FIGURE 1. It is believed that circuitry suitable for use in each of the blocks shown in FIGURE 1 may be found in the prior art. Accordingly, the novelty of the present invention is believed to lie in the combination of these individual blocks to provide a unique system for stabilizing the instantaneous frequency of an oscillator. Therefore, the embodiments in FIGURES 2 through 8 will be discussed with regard to their individual functions and information will be provided to enable construction thereof, but a detailed discussion of the various components comprising each of the embodiments appears unnecessary and will not be undertaken.

Figure 2:
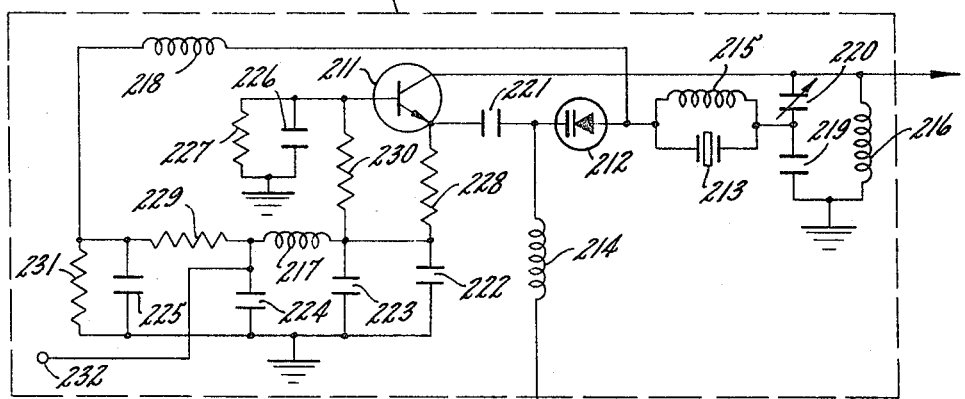

FIGURE 2, an embodiment of a voltage controlled, crystal oscillator circuit suitable for use as block 111 in FIGURE 1, provides at its output terminal a relatively fixed-frequency signal which is to be further stabilized by the invention. The frequency of this signal is primarily determined by the resonant frequency of the crystal 213, the choice of which is determined by the frequency which the invention is desired to produce. An input terminal for receiving a control voltage is coupled via a coil 214 to a varactor control diode 212, the capacitance of which may be varied by a control voltage resulting in a proportional change in the frequency provided by the oscillator at its output terminal. The following types and values of components and potentials have been tested and found satisfactory for comprising the circuitry of FIGURE 2:

Transistor 211 _____ 2N1505.
Element 212 _____ Varactor.
Crystal 213 _____ Selected (41.8 mc. used in test).
Inductances 214, 217,
  and 218 _____ 22 microhenries.
Inductance 215 _____ 2.2 microhenries.
Inductance 216 _____ .41 microhenry.
Capacitance 219 _____ 180 picofarads.
Variable capacitance
  220 _____ 7 to 45 picofarads.
Capacitances 221, 222,
  223, 224, and 226 __ 1000 picofarads.
Capacitance 225 _____ 8 microfarads.
Resistance 227 _____ 2200 ohms.
Resistance 228 _____ 390 ohms.
Resistance 229 _____ 180,000 ohms.
Resistance 230 _____ 2000 ohms.
Resistance 231 _____ 100,000 ohms.
D.C. potential source 232 __ −45 volts.

Figure 3:
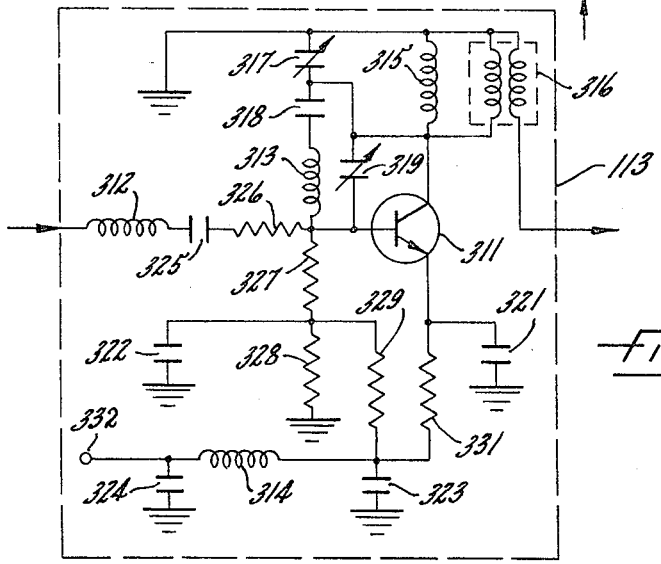

FIGURE 3 is an embodiment of a buffer amplifier suitable for use as block 113 in FIGURE 1, and the following types and values of components and potentials have been tested and found satisfactory for use therein:

Transistor 311 _____ 2N1505.
Inductance 312 _____ 1.5 microhenries.
Inductance 313 _____ 1 microhenry.
Inductance 314 _____ 22 microhenries.
Inductance 315 _____ .63 microhenry.
Element 316 _____ Transformer.
Variable capacitance 317 _____ 4 to 30 picofarads.
Capacitances 318, 321, 322,
  323, 324, and 325 _____ 1000 picofarads.
Variable capacitance 319 _____ 1.5 to 7 picofarads.
Resistance 326 _____ 30 ohms.
Resistance 327 _____ 20 ohms.
Resistance 328 _____ 2,200 ohms.
Resistance 329 _____ 2,000 ohms.
Resistance 331 _____ 390 ohms.
D.C. potential source 332 _____ −45 volts.

In the crystal phase shift circuit of FIGURE 4, which may be utilized as block 114 of FIGURE 1, is shown a crystal 411. The series resonant frequency $f_s$ of this crystal is selected to correspond to the frequency which the stabilized system of the invention is intended to provide and if good long term stability is desired or necessary, this crystal should be enclosed within a crystal oven in the usual manner. An input signal of frequency $f_s$ when applied to the circuit of FIGURE 4 will be passed to its output terminal without a shift in phase; however, any input signal which deviates from that frequency will be shifted in phase as it passes therethrough in proportion to the amount of frequency deviation. The following types and values of components have been tested and found satisfactory for use in this embodiment:

Crystal 411 _____ A-T cut, High "Q," 3rd overtone, $f_s$=41.8 mc.
Inductance 412 _____ 22 microhenries.
Inductance 413 _____ Selected.
Variable capacitance 414 ____ 7 to 45 picofarads.
Resistance 415 _____ 20 ohms.
Resistance 416 _____ 39 ohms.
Resistance 417 _____ 91 ohms.

Figure 5:
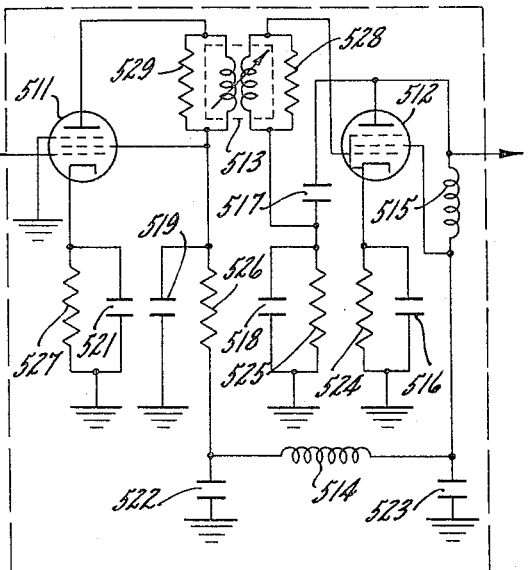

FIGURE 5 shows an embodiment of a tuned amplifier and limiter circuit suitable for use as blocks 115 and 118 of FIGURE 1. The amplifier is tuned to the frequency $f_s$ which the system is constructed to provide, and the limiting portion of the circuit removes undesired amplitude modulation components from the amplified signal as it is passed therethrough. This embodiment has been constructed and satisfactorily tested utilizing the following types and values of components:

| | |
|---|---|
| Tube 511 | 5702. |
| Tube 512 | 5639. |
| Element 513 | Transformer. |
| Inductance 514 | RF coil. |
| Inductance 515 | RF coil. |
| Capacitances 516, 521, 522, and 523 | 1000 picofarads. |
| Capacitance 517 | 1 picofarad. |
| Capacitance 518 | 100 picofarads. |
| Capacitance 519 | 470 picofarads. |
| Resistance 524 | 270 ohms. |
| Resistance 525 | 20,000 ohms. |
| Resistance 526 | 2,200 ohms. |
| Resistance 527 | 110 ohms. |
| Resistance 528 | 680 ohms. |
| Resistance 529 | 6,500 ohms. |

In FIGURE 6 a suitable embodiment of a phase detector circuit for use as block 116 of FIGURE 1 is shown, in which one input signal is applied to a first terminal via a coupling capacitance 631 and a second reference input signal is applied to a second input terminal via a coupling capacitance 629. So long as the time phase difference between these two input signals remains at ninety degrees, the output terminal coupled to the inductance 626 will be maintained at a D.C. potential of zero volts. However, should the time phase difference between the two input signals become greater than or less than ninety degrees, a D.C. potential proportional to this deviation from a ninety degree difference will be produced by the phase detector circuit and provided, via inductance 626, at its output terminal. The following types and values of components have been utilized in the construction and satisfactory testing of this embodiment:

| | |
|---|---|
| All diodes (611–623) | 1N914. |
| Elements 624 and 625 | Transformers. |
| Inductance 626 | RF coil. |
| Variable capacitances 627 and 628 | 1.5 to 7 picofarads. |
| Capacitances 629 and 631 | 1000 picofarads. |
| Capacitances 632 and 633 | 15 picofarads. |
| Resistances 634 and 635 | 100,000 ohms. |
| Potentiometers 636 and 637 | 0–500 ohms. |
| Resistance 638 | 10,000 ohms. |
| Terminals 639 and 641 | Test points. |

Figure 7:
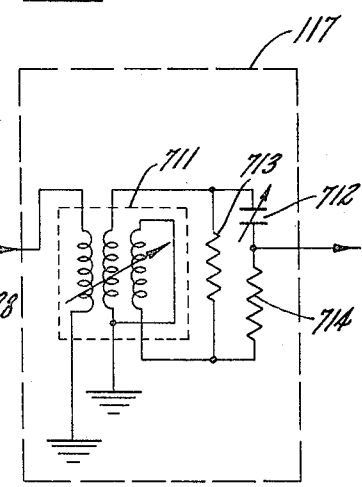

The embodiment of a variable phase shifter as shown in FIGURE 7 is suitable for use as block 117 of FIGURE 1 when it is adjusted to provide a ninety degree shift in time phase to all signals passed therethrough. Suitable component types and values have been found to include the following:

| | |
|---|---|
| Element 711 | Transformer. |
| Variable capacitance 712 | 7 to 45 picofarads. |
| Resistances 713 and 714 | 510 ohms. |

Figure 8:
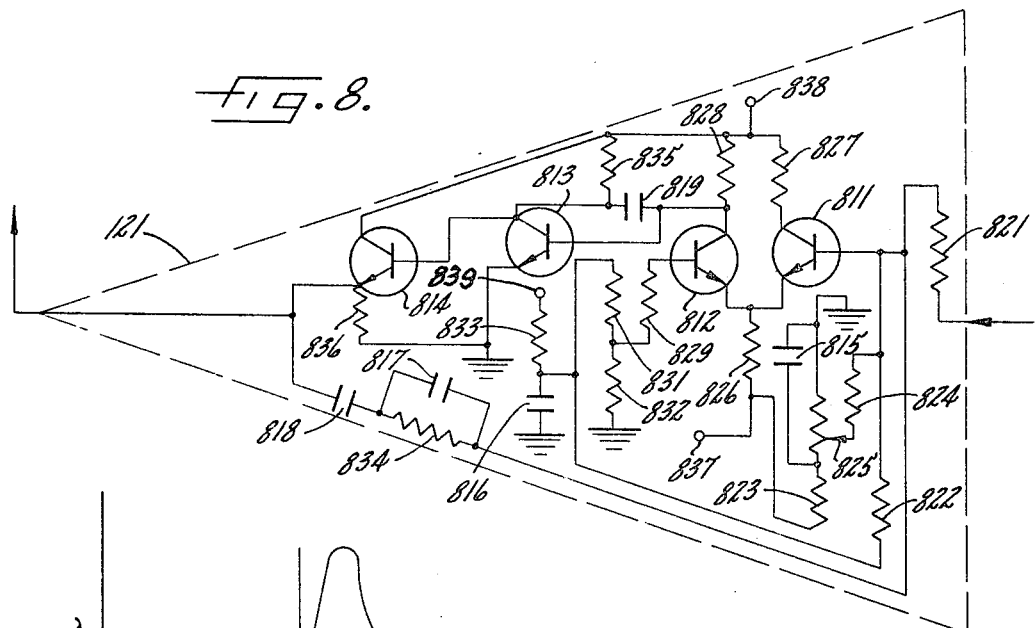
FIGURE 8 shows a schematic embodiment of a D.C. amplifier and feedback network suitable for use in block 121 of FIGURE 1.

In FIGURE 8 a D.C. amplifier and feedback network, suitable for use as block 121 of FIGURE 1, has its input terminal coupled via a resistance 821 to a transistor 811 and its output terminal coupled from transistor 814 to subsequent circuitry. The circuit amplifies the D.C. control signal passed therethrough. The following types and values of components and potentials have been tested and found satisfactory for use therein:

| | |
|---|---|
| Transistors 811, 812, 813, and 814 | 2N1547. |
| Capacitances 815 and 816 | 22 microfarads. |
| Capacitance 817 | 180 picofarads. |
| Capacitance 818 | 3300 picofarads. |
| Capacitance 819 | 4700 picofarads. |
| Resistance 821 | 2000 ohms. |
| Resistance 822 | 100,000 ohms. |
| Resistance 823 | 1000 ohms. |
| Resistance 824 | 35,000 ohms. |
| Potentiometer 825 | 0–10,000 ohms. |
| Resistances 826 and 827 | 7,500 ohms. |
| Resistance 828 | 15,000 ohms. |
| Resistance 829 | 5,100 ohms. |
| Resistance 831 | 46,000 ohms. |
| Resistance 832 | 200 ohms. |
| Resistance 833 | 1000 ohms. |
| Resistance 834 | 47,000 ohms. |
| Resistance 835 | 20,000 ohms. |
| Resistance 836 | 10,000 ohms. |
| D.C. potential source 837 | −45 volts. |
| D.C. potential sources 838 and 839 | +45 volts. |

Figure 9:
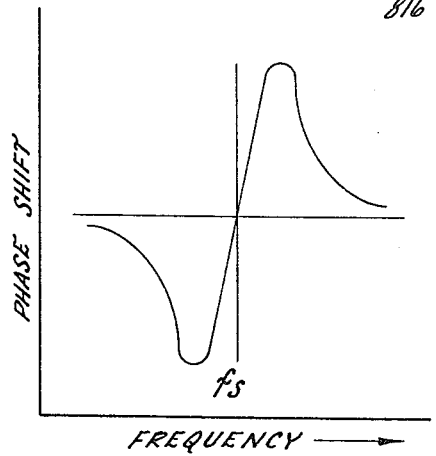
FIGURE 9 depicts the relationship of phase shift to changes in frequency as a signal is passed through a series crystal phase shift circuit such as that shown in FIGURE 4.

In FIGURE 9 is shown the frequency-phase shift relationship of a signal as it is passed through a crystal phase shift circuit of the type to be utilized as block 114 of FIGURE 1 (a suitable embodiment thereof being shown in FIGURE 4). The curve indicates that as the frequency of the applied signal deviates from the resonant frequency $f_s$ for which the circuit is constructed, the time phase shift imparted to the signal as it passes through the circuit increases rapidly from zero at $f_s$, to a proportional positive or negative shift on either side of $f_s$.

The curve of FIGURE 10 indicates the relationship of the relative amplitude of the signal which will be passed by a crystal phase shift circuit such as block 114 of FIGURE 1 to the deviation of that signal from the resonant frequency $f_s$ for which the circuit is designed. The curve shows that the greatest amplitude possible for an output signal will occur when the applied signal has the exact frequency $f_s$, and that the amplitude declines rather rapidly for signals whose frequencies deviate from $f_s$.

The curve of FIGURE 11 represents the relationship between phase difference and the D.C. output voltage of a phase detector circuit such as that utilized in block 116 (a suitable embodiment of which is shown in FIGURE 6). The curve indicates that so long as the relative time phase difference between an input signal and a reference signal, applied to a detector such as that in block 116, remains at ninety degrees the D.C. output signal produced by the detector circuit will remain at zero volts; however, when this relative time phase difference deviates from ninety degrees, the D.C. output signal will become a positive or negative voltage whose magnitude is proportional to the amount of deviation.

A suitable embodiment of the invention as depicted in FIGURE 1 has been constructed and satisfactorily tested utilizing the various component embodiments shown in FIGURES 2 through 8. For this test the stabilized frequency to be produced by the invention was 41.8 megacycles (mc.) per second, and the attenuator pad 112 of FIGURE 1 was constructed to provide an attenuation of six decibels.

It is to be understood that these particular embodiments, components, values, and frequencies are presented only for illustrative purposes and are not intended to limit the scope of the invention in any way.

OPERATION

The operation of the invention occurs in the following manner. It is assumed that oscillator 111, phase shift circuit 114, and tuned amplifier circuits 115 and 118 have been previously prepared (i.e. constructed and/or adjusted) to produce the particular frequency $f_s$ which the invention is intended to provide, in ultra stabilized form, at output terminal 122. Initially oscillator 111 provides at its output terminal a signal of relatively stable frequency $f_s$ which is passed via isolating attenuator pad 112 and buffer amplifier 113 to phase shift circuit 114. If the signal presented to phase shift circuit 114 is being maintained precisely at the desired frequency $f_s$ by oscillator 111, that signal will be permitted to pass through circuit 114 without introduction of any phase shift thereby (as indicated by the curve of FIGURE 9) and at maximum amplitude (as indicated by the curve of FIG- URE 10); however, if the frequency of the signal being produced by oscillator 111 has deviated slightly from the desired frequency $f_s$, this signal will be shifted in phase as it passes through circuit 114 in proportion to the amount of this frequency deviation, and the amplitude of the signal will be decreased (see FIGURES 9 and 10). The signal is then applied to tuned amplifier and limiter circuit 115. This circuit, which is tuned to frequency $f_s$, amplifies the signal while the voltage limiter portion thereof removes any undesired amplitude modulation components from the signal. The signal is then applied as a first input signal to phase detector 116. The phase detector 116 has a second input, or reference, signal applied thereto which is obtained by passing a portion of the output signal of oscillator 111 through a phase shifter 117 which has been adjusted to provide a ninety degree shift in time phase to any signal passing therethrough. The output of ninety degree phase shifter 117 is then passed through tuned amplifier and limiter circuit 118 and applied as the reference signal to detector 116.

Phase detector 116 compares the time phase difference between the signal applied to its first input terminal which has been passed through crystal phase shift circuit 114, and the reference signal applied to its second input terminal; so long as this time phase difference is exactly ninety degrees (indicating that the frequency of the signal being produced by oscillator 111 is precisely the desired frequency $f_s$ because if it were not, the signal applied to the first input terminal would have been shifted in time phase in passing through crystal phase shift circuit 114 by an amount proportional to the deviation from that frequency), the D.C. output voltage produced by phase detector 116 will remain at zero volts. However, if this time phase difference is greater than, or less than, ninety degrees (which will result when the phase shift circuit 114 introduces a phase shift proportional to any deviation of the signal from the desired frequency $f_s$), the D.C. output voltage produced by phase detector 116 will no longer be zero, but will become a voltage proportional to the deviation, in relative time phase, from ninety degrees, as indicated by the phase detector characteristic curve shown in FIGURE 11. This D.C. output voltage of detector 116 is passed through D.C. amplifier and feedback network 121 and provided to the input voltage control terminal of oscillator 111. This D.C. voltage is applied to a vernier control element within oscillator 111 which is capable of causing the oscillator to vary in frequency in an amount and direction sufficient to cause the oscillator to return precisely to the desired frequency $f_s$, which then becomes the stabilized output frequency provided to output terminal 122, for application in other circuitry. A suitable embodiment of an oscillator for use in block 111 of FIGURE 1, as shown in FIGURE 2, utilizes a varactor diode 212 as the vernier control element. The D.C. control voltage applied to the varactor diode results in a change in its effective capacitance thereby varying the oscillator frequency to return it precisely to the desired frequency $f_s$, at which time the phase shift formerly introduced in the control loop by phase shift circuit 114 will decrease to zero, causing the time phase difference present at detector circuit 116 to return to ninety degrees and its D.C. output voltage to return to zero. Once in operation, the invention constantly guards against, and if necessary compensates for, any deviation by oscillator 111 from the desired frequency $f_s$, thus providing an ultra stable frequency reference signal at output terminal 122.

Input terminal 120 and summation point 119 are provided at the input terminal of D.C. amplifier 121 as an optional feature, and may be utilized for injecting a modulation command signal if a particular application should make such modulation desirable. An audio frequency input signal may be applied at a moderately low level to terminal 120, and this will result in direct frequency modulation of the output signal. Phase modulation may be just as readily obtained by passing the audio signal through an appropriate filter network prior to application at terminal 120.

Thus it becomes apparent from the foregoing description and annexed drawings that the invention, an ultra precise oscillator phase stabilization system, is a useful and practical device having many applications in the field of electronics.

Obviously many modifications and variations of the present invention are possible in the light of the above teachings. It is therefore to be understood that, within the scope of the appended claims, the invention may be practiced otherwise than as specifically described.

We claim:

1. An electronic oscillator stabilization system for providing an output signal having a high degree of frequency and phase stability comprising:

a high quality crystal controlled transistor oscillator means having output means for providing a frequency controlled output signal, and having input means for receiving a signal for regulating a solid state varactor diode element which comprises a vernier frequency control element in said oscillator means;

an electrical attenuation means having input and output terminal means, said input terminal means being coupled to said output means of said electronic oscillator means;

a buffer amplifier means having input and output means, said input means thereof being coupled to said output terminal means of said electrical attenuation means for receiving a signal from said oscillator means therethrough;

a series crystal phase shifting means comprising a first phase shifting means for sensing any deviations from a predetermined frequency in signals passing therethrough and introducing a phase shift in said signals proportional to said deviations in frequency, said phase shifting means having input and output means, said input means thereof being coupled to said output means of said buffer amplifier means;

a first tuned amplifier and limiter means having input and output means, said input means thereof being coupled to said output means of said first phase shifting means;

a second phase shifting means for introducing a phase shift of predetermined amount into any signal passed therethrough, having input and output means, said input means thereof being coupled to said output means of said oscillator means;

a second tuned amplifier and limiter means having input and output means, said input means thereof being coupled to said output means of said second phase shifting means;

a phase detector means having a first input means coupled to said output means of said first tuned amplifier and limiter means for receiving a first signal therefrom, having a second input means coupled to said output means of said second tuned amplifier and limiter means for receiving a reference signal therefrom, and having an output means coupled to said input means of said oscillator means for providing thereto a direct current potential proportional to the amount of deviation from a predetermined relative phase difference between said first signal and said reference signal, to regulate said vernier frequency control element within said oscillator means thereby causing said oscillator means to maintain a very stable frequency output signal; and an output terminal means coupled to said output means of said oscillator means, to provide said very stable frequency output signal thereat for utilization in subsequent circuitry.

2. An electronic oscillator stabilization system for providing an output signal having a high degree of frequency and phase stability comprising:
- a high quality crystal controlled transistor oscillator means having output means for providing a frequency controlled output signal, and having input means for receiving a signal for regulating a solid state varactor diode element which comprises a vernier frequency control element in said oscillator means;
- an electrical attenuation means having input and output terminal means, said input terminal means being coupled to said output means of said electronic oscillator means;
- a buffer amplifier means having input and output means, said input means thereof being coupled to said output terminal means of said electrical attenuation means for receiving a signal from said oscillator means therethrough;
- a series crystal phase shifting means comprising a first phase shifting means for sensing any deviations from a predetermined frequency in signals passing therethrough and introducing a phase shift in said signals proportional to said deviations in frequency, said phase shifting means having input and output means, said input means thereof being coupled to said output means of said buffer amplifier means;
- a first tuned amplifier and limiter means having input and output means, said input means thereof being coupled to said output means of said first phase shifting means;
- a second phase shifting means for introducing a phase shift of predetermined amount into any signal passed therethrough, having input and output means, said input means thereof being coupled to said output means of said oscillator means;
- a second tuned amplifier and limiter means having input and output means, said input means thereof being coupled to said output means of said second phase shifting means;
- a phase detector means having a first input means coupled to said output means of said first tuned amplifier and limiter means for receiving a first signal therefrom, having a second input means coupled to said output means of said second tuned amplifier and limiter means for receiving a reference signal therefrom, and having an output means for providing thereat a direct current potential proportional to the amount of deviation from a predetermined relative phase difference between said first signal and said reference signal;
- a direct current amplifier and feedback means to provide controlled amplification of a direct current signal, having input means coupled to said output means of said phase detector means for receiving therefrom said direct current potential, and having output means coupled to said input means of said oscillator means to provide thereto, after amplification, said direct current potential for regulating said vernier frequency control element within said oscillator means thereby causing said oscillator means to maintain a very stable frequency output signal, said input means of said direct current amplifier and feedback means having a summation point for application of a modulation command signal to provide frequency modulation of said very stable frequency output signal;
- an output terminal means coupled to said output means of said oscillator means, to provide said very stable frequency output signal thereat for utilization in subsequent circuitry.

References Cited by the Examiner
UNITED STATES PATENTS

| | | | |
|---|---|---|---|
| 2,065,565 | 12/1936 | Crosby | 331—1 |
| 2,456,763 | 12/1948 | Ziegler | 331—17 |
| 2,752,512 | 6/1956 | Sarratt | 331—1 |
| 2,777,955 | 1/1957 | Gabor | 331—1 |
| 3,010,073 | 11/1961 | Melas | 331—1 |
| 3,021,492 | 2/1962 | Kaufman | 331—36 |
| 3,197,714 | 7/1965 | Prevallet | 331—1 |

References Cited by the Applicant
UNITED STATES PATENTS

| | | |
|---|---|---|
| 2,297,409 | 9/1942 | Heinecke. |
| 2,298,774 | 10/1942 | Parker. |
| 2,459,842 | 1/1949 | Royden. |
| 2,751,518 | 6/1956 | Pierce. |

NATHAN KAUFMAN, *Primary Examiner.*

J. KOMINSKI, *Assistant Examiner.*